Jan. 25, 1955   C. J. PORTH   2,700,242
BAIT HARNESS
Filed Dec. 3, 1949   4 Sheets-Sheet 1
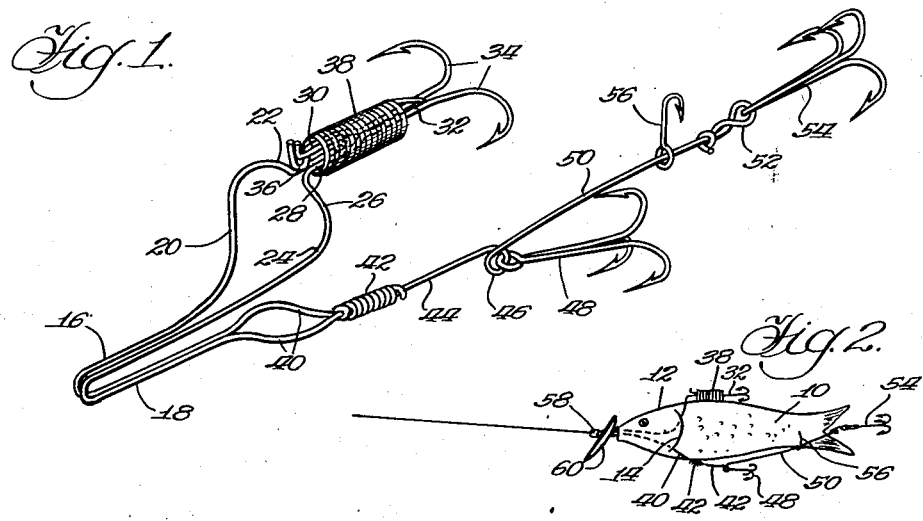
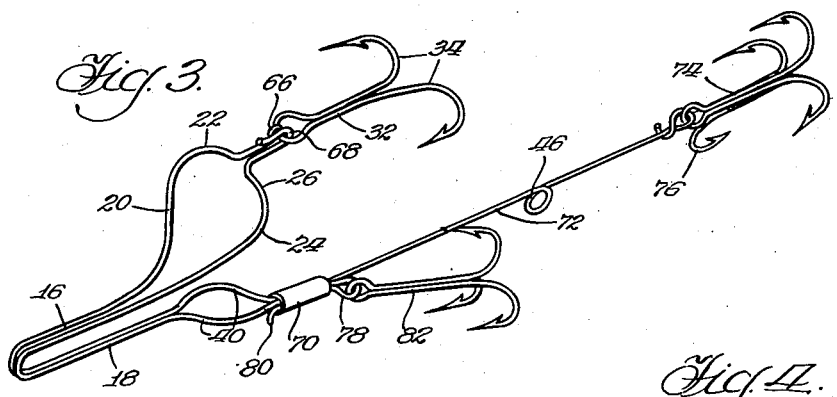
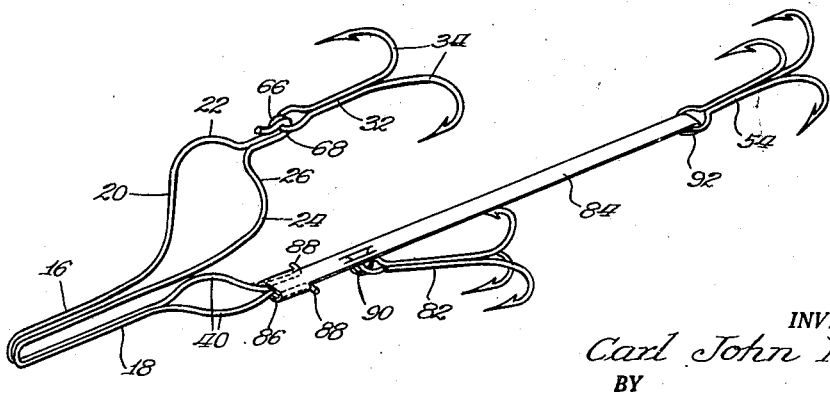
INVENTOR.
Carl John Porth
BY
Donald H. Sweet  Atty.

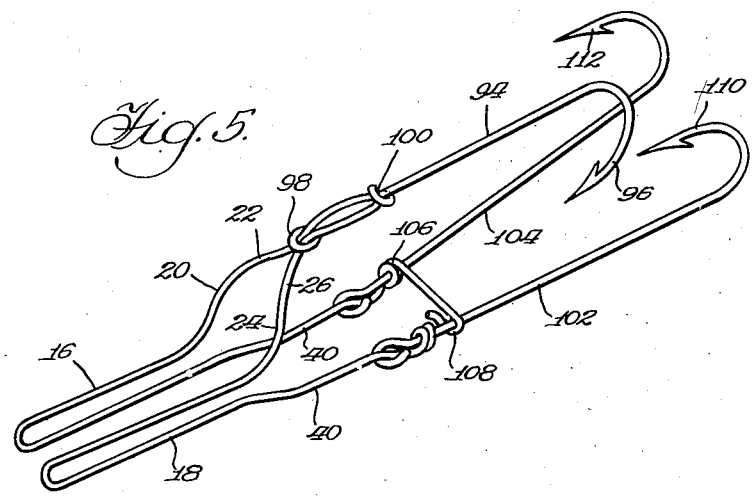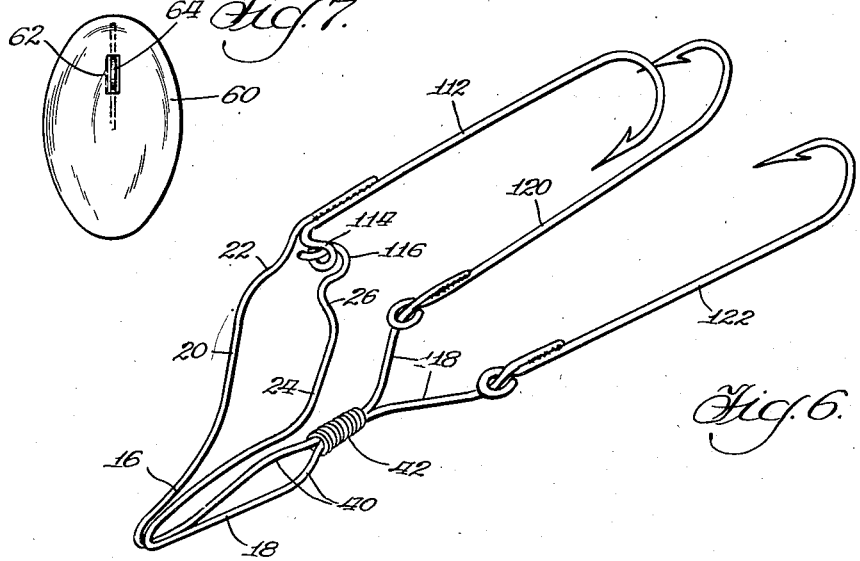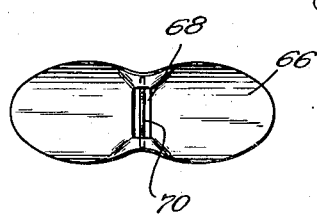

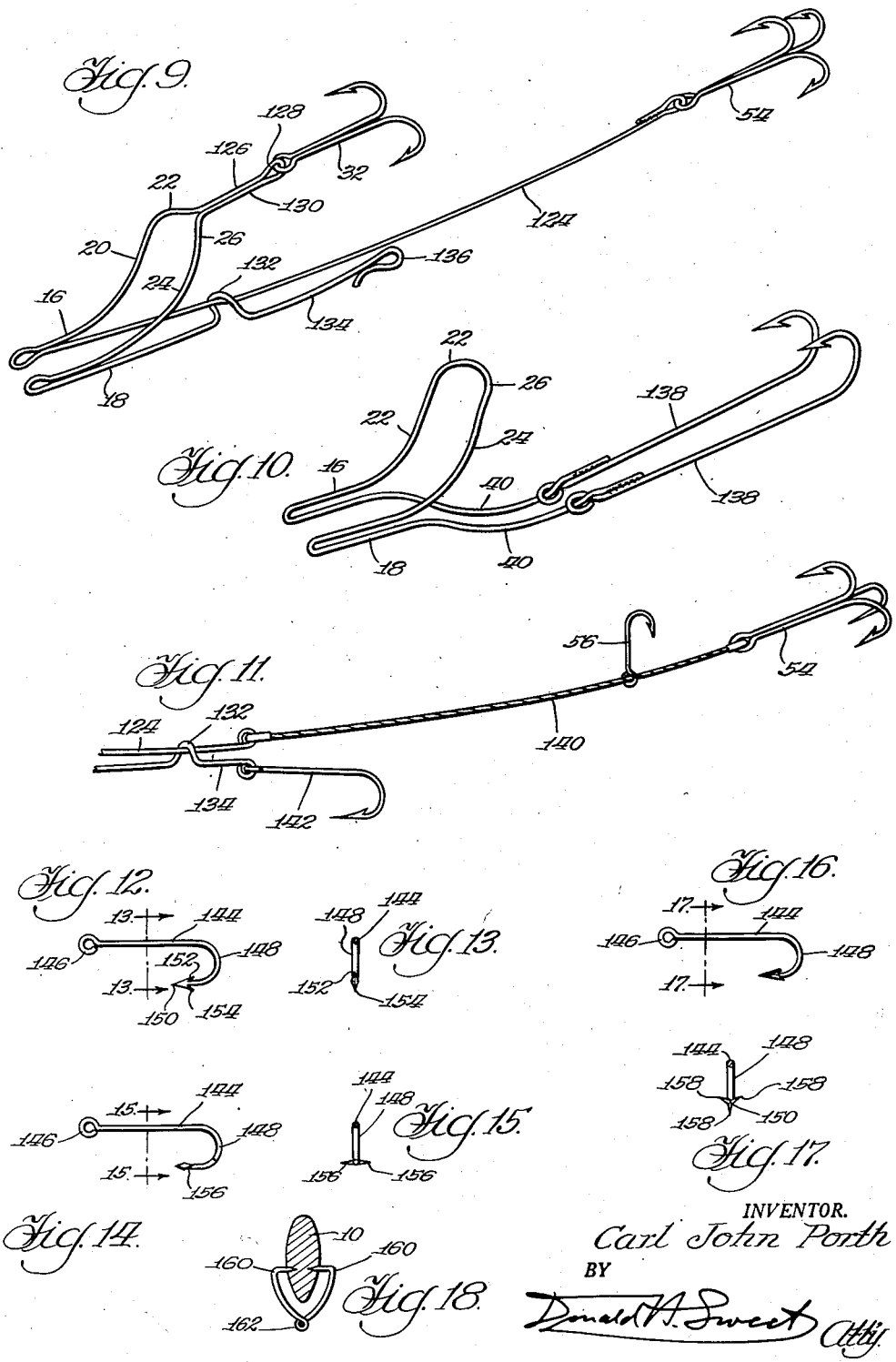

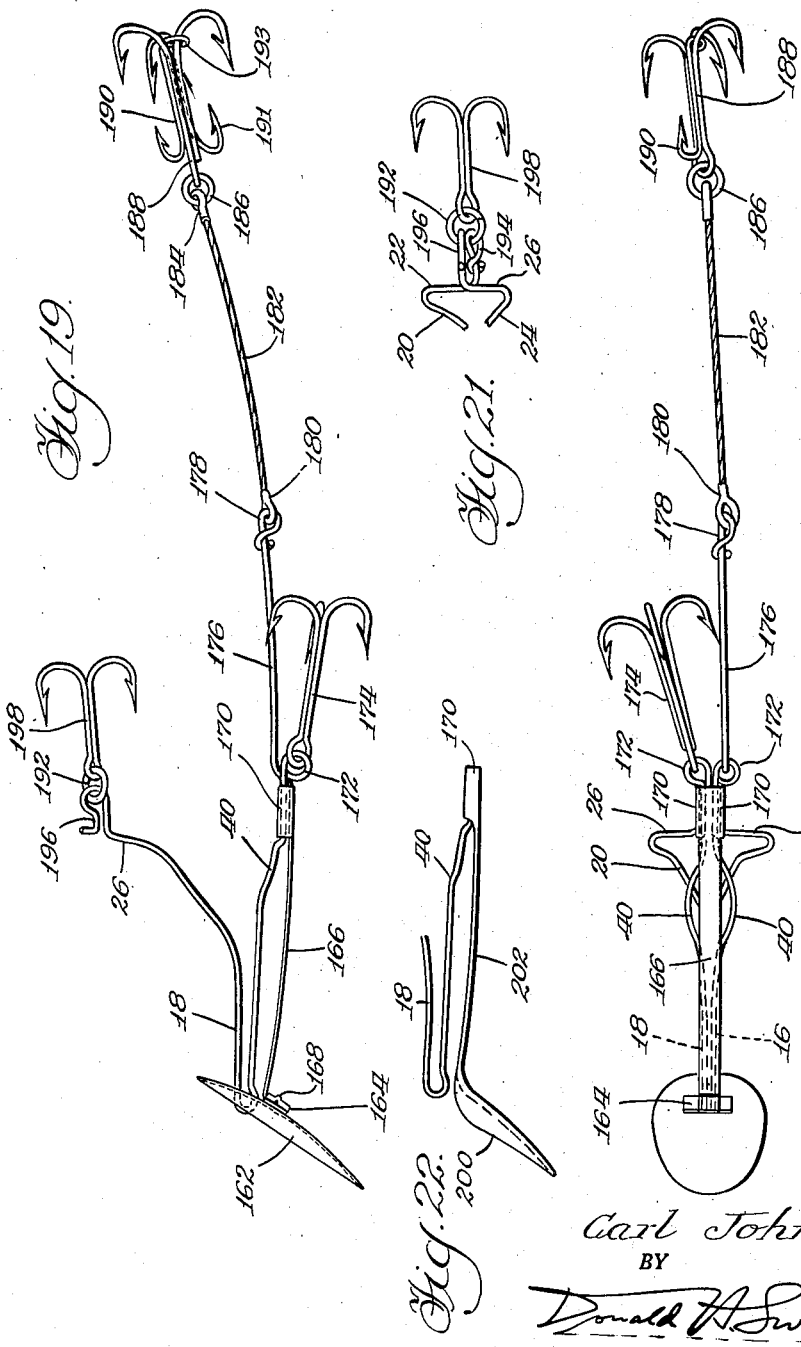

United States Patent Office 2,700,242
Patented Jan. 25, 1955

2,700,242

BAIT HARNESS

Carl John Porth, Merrill, Wis.

Application December 3, 1949, Serial No. 130,958

7 Claims. (Cl. 43—44.4)

My invention relates to fishing and includes among its objects and advantages the improved means for holding a live or fresh minnow in proper proximity to a set of hooks and drawing it along through the water with a minimum of mechanical damage.

In the accompanying drawings,

Figure 1 is a perspective of a complete harness for medium or large size minnows;

Figure 2 is a side elevation of a minnow fitted with the harness of Figure 1;

Figure 3 is a perspective of a modified harness;

Figure 4 is a similar perspective of a harness embodying a reach of sheet metal;

Figure 5 is a perspective of a harness employing larger hooks and a bottom closure;

Figure 6 is a perspective of a harness with large hooks and a top closure;

Figure 7 is a front elevation of a diving spoon;

Figure 8 is a front elevation of a wobbling spoon;

Figure 9 is a perspective of a form suitable for relatively large minnows;

Figure 10 is a perspective of a large hook model for a small minnow;

Figure 11 is a partial perspective of a modification of the embodiment of Figure 9 for use on very large minnows;

Figure 12 is a side elevation of a double-barbed hook;

Figure 13 is a section on line 13—13 of Figure 12;

Figure 14 is a side elevation of a double barbed hook with its barbs in a different plane;

Figure 15 is a section on line 15—15 of Figure 14;

Figure 16 is a side elevation of a triple barbed hook;

Figure 17 is a section on line 17—17 of Figure 16;

Figure 18 is a section of an alternative body hook for the reach of any of the harnesses shown;

Figure 19 is a side elevation of a harness with a brace for the girdle;

Figure 20 is a bottom view of the same harness looking up from below;

Figure 21 is a detail top view of the connections for the top gang hook; and

Figure 22 is a side elevation of a modified spoon and guard.

In the embodiment of the invention selected for illustration in Figures 1 and 2 the minnow is indicated conventionally as having a body 10 and head 12 with gill covers 14 substantially at the rear of the head. The head, back to the gill covers, has more rigidity and mechanical strength than the body of the minnow. The harness of Figure 1 has two substantially parallel U-shaped front reaches 16 and 18 with their bights at the front end. These reaches may be slipped under the gill covers 14 from the rear and extend forward through the fish's mouth and out in front without any mutilation of the fish. From the upper edge of the reach 16 the material curves upwardly to define an abutment 20 and then around and inward as indicated at 22 to terminate above the body of the fish in substantially the median plane of the body. The upper leg of the reach 18 is continued in a duplicate abutment 24 which also curves in at 26 to meet the curved portion 22. Where the portions 26 and 22 meet they are continued rearwardly in parallelism as at 28 and then upwardly and forward again as at 30 to define a U-shaped bight for receiving the eye of a gang hook 32 made up of two individual hooks 34. To prevent accidental disassembly one of the forwardly extending portions 30 is bent down and then up again to define a hump 36 that must be resiliently displaced a little to let the eye of the gang hook get into or out of assembled position. I have indicated a light coil spring 38 encircling the connection between the gang hook and the harness. It normally presses against the upturned wire ends in front, but is illustrated drawn back a little so that the hump 36 can be seen. When the minnow floats on or near the surface of the water, this coil will form bubbles in the water as the minnow is pulled forward.

The lower legs of the reaches 16 and 18 are curved around and under the body of the fish as indicated at 40. One of the legs is wound around the other at 42 to form a permanent assembly. It will be apparent that by pulling the spring 38 down on the shank of the gang hook 32 the hook can be removed. Thereafter the harness can be assembled on the minnow by flexing the portions 22 and 26 apart to admit the minnow's body between them, and sliding the reaches 16 and 18 forward through the minnow's mouth. Then the curved portions 22 and 26 are brought back together again and fastened in the assembled position of Figure 1 by putting the gang hook back on.

One of the legs of the reach is continued beyond the union at 42 to define a short belly reach 44; a loop or eye 46 engaging the eye of a tripple gang hook 48; a somewhat longer belly reach 50; and a tail eye 52 engaging the triple gang hook 54.

To hold the gang hook 54 dependably up in the position indicated in Figure 2 I provide a relatively small single body hook 56. The angler can slip this into the rear end of the fish's body just in front of the tail fin as clearly indicated in Figure 2. This is another portion of the body of the fish which is relatively firm and mechanically strong, and since the load on the hook 56 is only that necessary to hold the reach 50 and gang hook 54 in alignment with the body 10, or vice versa, it is a very durable connection. Furthermore the insertion of such a hook involves only a relatively slight mutilation of the body of the fish at a point where no vital organ is affected.

In the completed assembly of Figure 2 the bights of the reaches 16 and 18 are connected by the angler to a conventional eyelet or wire loop 58. The minnow may be used in this way without any additional equipment or assembled with a spoon. The diving spoon 60 illustrated in Figures 2 and 7 is a shallow saucer-shaped plate having a vertical slot 62 and a forwardly extending U-shaped loop 64 centrally located in the slot. This leaves clearance on each side of the loop 64 so that the reaches 16 and 18 can be slipped through the slot 62 to have the bights lie beside the loop 64 with the eyelet 58 engaged through all three pieces.

In Figure 8 the spoon 66 has its maximum dimension horizontal and is of the conventional forwardly concave shape employed to produce an oscillation from side to side. The vertical slot 68 and loop 70 may be identical in configuration and function with the slot 62 and loop 64.

In the embodiment of Figure 3 the front reaches 16 and 18, abutments 20 and 24, and curved-in portions 22 and 26 may be the same as in Figure 1. The double gang hook 32 is permanently assembled with one curved-in portion by bending the end around it as indicated at 66 and separably assembled with the other turned-in portion by hooking its eye into the reversely turned end 68. Under the fish the two reaches are bound together within a sheet metal sleeve 70. One of the wires passing through the sleeve 70 is continued rearwardly to define the belly reach 72 having its looped rear end engaged with the eye of the gang hook 74. In this embodiment the small body hook 76 is integral with the gang hook 74. This enables the angler to position the hook 74 so that it will move in complete unison with the tail of the minnow.

The other longitudinal wire passing through the sleeve 70 is looped back through the sleeve to define a rear loop 78 and a retaining hook 80 to hold the parts assembled, and the rear loop 78 passes through the eye of the bottom gang hook 82. Parts 78 and 80 prevent longitudinal shifting of the sleeve 70 on one wire. If the other wire is free to slide just a little in the sleeve 70, the load of playing a heavy fish can be carried without straining the sleeve.

In the embodiment of Figure 4 the reaches 16 and 18 and all the parts above the fish's body are the same as in Figure 3. The rear or lower reach 84 may be a strip of shiny sheet metal. The rear ends of the reaches engage in grooves 86 at the front end of the reach 84, formed by bending lateral ears down and then inward, and the extreme rear ends of the wire are turned out as indicated at 88 to fasten the parts together. The gang hook 82 may be identical with the corresponding hook in Figures 1 and 3, and held in place by engagement with a loop 90 struck down out of the reach 84. The gang hook 54 may be identical with the corresponding hook in Figure 1, and the strip 84 may be bent around it as indicated at 92. It would be possible to provide such an assembly with a rear holding hook corresponding to the hook 56 of Figure 1 or to the hooks 76 of Figure 3, but because a little relative movement between the rear portion of the minnow's body and the strip 84 adds to the attractiveness of the lure, no such hook is employed.

For minnows that are smaller, compared to the size of the fish the angler is trying to catch, I prefer to use hooks that are larger compared with the size of the minnow. In Figure 5 the reaches 16 and 18 have the abutment portions 20 and 24 and the curved-in portions 22 and 26, which latter portions are permanently connected and permanently assembled with a relatively large hook 94 positioned to have its shank lie along the back of the minnow with the barb 96 lying close beside the minnow's body near the tail. One convenient assembly is to have the eye 98 of the hook receive both the relatively small wires of the girdle, which are continued rearwardly and then wrapped around the shank as indicated at 100.

In this embodiment the separable connection is at the bottom. The near reach 40 passes through the eye of a hook 102, and its end is then wrapped around the shank of the hook. The far reach 40 passes through the eye of the hook 104, and its end is then wrapped one and a half times around the shank 104 as indicated at 106 and then extended across and back again to define a latching hook 108 receiving the shank of the barbed hook 102. To assemble the harness on the minnow the hook 108 is disengaged, and the portions 40 can be separated to let the body of the minnow enter from below. The hooks 102 and 104 are of substantially the same size as the hook 94 and are positioned a little further to the rear, and the barbs 110 and 112 project upwardly. The entire harness, except the hooks, may be made up from a single length of wire with the loops at 100 almost midway between its ends.

Referring now to Figure 6, the permanent connection for the girdle is below as in Figure 1. One of the curved-in portions 22 extends back parallel to the shank of a hook 112 and is welded or soldered to it. The shank 112 has an offset eye 114 to receive the removable end hook 116 on the end of the curved-in portion 26. Back of the bottom union at 42 the rearwardly extending wires diverge at 118, and the ends pass through the eyes of the lower hooks 120 and 122, being also attached by welding or soldering. The hooks 112, 120 and 122 can be positioned in the same space relationship as the hooks 94, 102 and 104 in Figure 5.

In Figure 9 also a single strip of wire is employed to form the entire unit except for the hooks. The reach 124 is eyeletted into the gang hook 54 at its rear end. It extends all the way forward to end in the front reach 16. The curved-in portion 22 continues rearwardly at 126 to define the eyelet 128 holding the upper gang hook 32 and then forwardly again at 130 to join with the curved portion 26. These reaches 126 and 130 contribute materially to flexibility and make it easier to put the harness in place without hurting the minnow. The wire continues through the shoulder 24 and front reach 18 and is then bent laterally across and back to define a bight 132 after which it extends a little further back at 134 and terminates in an eyelet 136 adapted to receive a gang hook in detachable relationship. It will be apparent that slipping the portion 134 over the adjacent reach 124 will disengage the bight 132 and let the bottom of the harness open to receive the minnow.

A simplified device for small minnows is indicated in Figure 10, where the curved-in portions 22 and 26 are integral with each other. By employing the right size of wire it is easy to make the flexibility such that the portions 40 can be separated to slip over the body of a minnow inserted from below. The rear ends of the sections 40 are united as in Figure 6 with relatively long hooks 138, both of which have their barbs turned up.

In Figure 11 I have indicated a modification of Figure 9 in which the wire reach 124 ends just a little back of the notch 132, and the main reach 140 is a flexible woven wire or cable. This is particularly suitable for very large minnows, and I prefer to have the rear gang hook 54 allowed a degree of freedom that can easily be adjusted by the user by varying the longitudinal position of the body hook 56. With an articulation between the reach 124 and the flexible reach 140, it is desirable to have the belly hook 142 permanently assembled with the end of the wire 134.

Referring now to Figures 12 and 13, the hook illustrated has a conventional straight shank 144, an eye 146 and reversely curved bight 148. The tip of the bight is formed with the usual point 150, but back of the point I provide two barbs 152 and 154 extending in opposite directions to increase the certainty of engagement.

In Figures 14 and 15 parts are the same except that the barbs 156 lie in a plane at right angles to the plane of the bight 148. In Figures 16 and 17 the end of the bight 148 is provided with three equally spaced barbs 158. While I have indicated a hook with the bight and shank lying in the same plane, it will be obvious that the customary lateral deflection of the bight may also be employed as desired.

Especially for relatively large minnows, it is advantageous, as indicated in Figure 18, to replace the conventional barbed hook 56 with two resiliently connected hook-shaped members 160. The resilient connection can be a few turns of the wire itself, wrapped at 162 around the bottom reach of the harness, so that the hooks 160 can be drawn apart and need only penetrate lightly into the body 10 to remain effectively in position until after the fish strikes.

In the embodiment of Figures 19 and 20, the spoon 162, which is illustrated as a diving spoon, is connected to the reaches 16 and 18 in the same way as in Figures 2 and 7. It also carries a hanger 164 on its rear face to receive the downwardly extending front end of the brace and shield 166. The front end of this shield may have a resilient hump in it to fit in the notch 168 and hold the parts together detachably. The rear end of the shield has ears 170 turned over to define tubes receiving the rear ends of the reaches 40. In the embodiment illustrated, both reaches 40 end just back of the sleeves 170 in eyelets 172. One of the eyelets carries the gang hook 174 and the other receives a short spacer 176. The rear end of the spacer 176 is looped at 178 to receive the eyelet 180 at the front end of the wire cable 182. It may also receive an additional gang hook if desired. The rear eyelet 184 receives a conventional split ring 186 by means of which the gang hook 188 is connected to the rear of the cable. This gang hook is provided with body hooks 190 and 191 similar to the hooks 76 of Figure 3. Hook 190 has no eye, and is soldered on. Hook 191 has an eye 193 receiving the gang hook, and its shank is also soldered.

The inwardly extending reaches 22 and 26 at the top of the girdle are entered into another conventional split ring or detachable eyelet 192. In this instance the portion 22 terminates in a closed eye 194, and the portion 26 in a forwardly opening U-shaped hook 196. These may be assembled with the eyelet just as the corresponding parts are assembled with the eye of the gang hook in Figures 3, 4 and 19, or they may be crossed over as indicated in Figure 21 so that the eyelet 192 holds them closer together. This provides an advantageous variation available to the user at the time of use. If the minnow is a little large for the harness, the portions 22 and 26 are not crossed over but assembled as in Figures 3 and 4, but if the minnow is a little small, the crossed-over arrangement reduces the size of the harness a little. It will be obvious that the constructions of Figures 3 and 4 can be assembled either way, or that a split ring could be used to attach any of the gang hooks in any embodiment. The gang hook 198 of Figures 19, 20 and 21 has two barbs, and under certain conditions the user might prefer to replace it with a hook having three barbs, or only one.

The shield 166 of Figures 19 and 20 is a material protection to the body of the minnow against impact with twigs, stones and other objects, including striking the water when cast out, so that a minnow in such a harness can stand a good deal more throwing around without injury.

In Figure 22 the diving spoon 200 is not apertured to receive the reach 18, but the shield 202 is a little stiffer than the shield 166, and acts as a cantilever extending forward from the ears 170, to support the spoon in the position illustrated. Both shields 166 and 202 underlie the soft underside of the minnow's body under the gills which is the portion that most needs mechanical protection.

Others may readily adapt the invention for use under various conditions of service by employing one or more of the novel features involved, or equivalents thereof. As at present advised with respect to the apparent scope of my invention, I desire to claim the following subject matter:

1. In a minnow holder, a wire contact frame having four contact portions; said portions including two upper portions located side by side, and two lower portions located side by side, said upper portions including upper front reaches approximately parallel to a longitudinal axis; said upper portions, at the rear of said upper front reaches, being curved outwardly and upwardly, and then inwardly toward each other to overlie the back of a minnow; said lower portions including lower front reaches located side by side approximately parallel to and below said upper front reaches; said lower portions, at the rear of said front reaches, being curved outwardly and rearwardly and then inwardly and rearwardly to underlie the belly of a minnow; front end connections adjacent the front ends of said front reaches uniting said front reaches in two pairs; said connections each comprising an integral bight connecting the front ends of two reaches; said bights being adapted to receive a tension member for delivering a longitudinal forward pull; there being hook means operatively connected to the rear of certain of said portions.

2. A holder according to claim 1, in which said integral bights connect adjacent reaches, each pair being adapted to slip under the gill cover of a minnow and extend forward through the mouth thereof.

3. A holder according to claim 2, in which each said united pair of reaches comprise the upper and lower reaches on each side of the frame.

4. In a minnow holder, a wire contact frame having four contact portions; said portions including two upper portions located side by side, and two lower portions located side by side, said upper portions including upper front reaches approximately parallel to a longitudinal axis; said upper portions, at the rear of said upper front reaches, being curved outwardly and upwardly, and then inwardly toward each other to overlie the back of a minnow; said lower portions including lower front reaches located side by side approximately parallel to and below said upper front reaches; said lower portions, at the rear of said front reaches, being curved outwardly and rearwardly and then inwardly and rearwardly to underlie the belly of a minnow; front end tension connections adjacent the front ends of said front reaches uniting said front reaches in two pairs; there being hook means associated with the rear end of certain of said portions.

5. In a minnow holder, a wire contact frame having four contact portions; said portions including two upper portions located side by side, and two lower portions located side by side, said upper portions including upper front reaches approximately parallel to a longitudinal axis; said upper portions, at the rear of said upper front reaches, being curved outwardly and upwardly, and then inwardly toward each other to overlie the back of a minnow; said lower portions including lower front reaches located side by side approximately parallel to and below said upper front reaches; said lower portions, at the rear of said front reaches, being curved outwardly and rearwardly and then inwardly and rearwardly to underlie the belly of a minnow; and front end tension connections adjacent the front ends of said front reaches.

6. In a minnow holder, a wire contact frame having four contact portions; said portions including two upper portions located side by side, and two lower portions located side by side, said upper portions including upper front reaches approximately parallel to a longitudinal axis; said upper portions, at the rear of said upper front reaches, being curved outwardly and upwardly, and then inwardly toward each other to overlie the back of a minnow; said lower portions including lower front reaches located side by side approximately parallel to and below said upper front reaches; said lower portions, at the rear of said front reaches, being curved outwardly and rearwardly and then inwardly and rearwardly to underlie the belly of a minnow; front end tension connections adjacent the front ends of said front reaches; means for fastening the rear ends of the lower reaches together; and means for fastening the rear ends of said upper reaches together.

7. In a minnow holder, a wire contact frame having four contact portions; said portions including two upper portions located side by side, and two lower portions located side by side, said upper portions including upper front reaches approximately parallel to a longitudinal axis; said upper portions, at the rear of said upper front reaches, being curved outwardly and upwardly, and then inwardly toward each other to overlie the back of a minnow; said lower portions including lower front reaches located side by side approximately parallel to and below said upper front reaches; said lower portions, at the rear of said front reaches, being curved outwardly and rearwardly and then inwardly and rearwardly to underlie the belly of a minnow; and front end tension connections integral with and adjacent the front ends of said front reaches.

References Cited in the file of this patent

UNITED STATES PATENTS

| Number | Name | Date |
|---|---|---|
| 471,548 | Haviland | Mar. 29, 1892 |
| 849,036 | Zimmerman | Apr. 2, 1907 |
| 1,025,695 | Gibson | May 7, 1912 |
| 1,154,528 | Meguiar | Sept. 21, 1915 |
| 1,862,187 | Lageson | June 7, 1932 |
| 2,196,376 | Anderson | Apr. 9, 1940 |
| 2,208,069 | Broz | July 16, 1940 |
| 2,476,126 | Weiss | July 12, 1949 |

FOREIGN PATENTS

| 802,293 | France | Sept. 1, 1936 |